United States Patent [19]

Moggi et al.

[11] Patent Number: 4,739,024
[45] Date of Patent: Apr. 19, 1988

[54] PROCESS FOR PREPARING VINYLIDENE FLUORIDE HOMOPOLYMERS AND ITS COPOLYMERS

[75] Inventors: Giovanni Moggi, Milan; Alessandra Caratto, Alessandria; Piergiorgio Bonardelli, Brescia; Claudio Monti, Milan, all of Italy

[73] Assignee: Montefluos S.p.A., Milan, Italy

[21] Appl. No.: 4,226

[22] Filed: Jan. 5, 1987

Related U.S. Application Data

[63] Continuation of Ser. No. 779,951, Sep. 20, 1985, abandoned.

[30] Foreign Application Priority Data

Sep. 24, 1984 [IT] Italy ................................ 22802 A/84
Jul. 8, 1985 [IT] Italy ................................ 21471 A/85

[51] Int. Cl.$^4$ .................... C08F 2/00; C08F 14/18; C08F 8/00; C08K 5/09
[52] U.S. Cl. .................... 526/216; 524/773; 525/326.3; 526/254; 526/255
[58] Field of Search ............ 524/773; 525/326.3; 526/216, 254, 255

[56] References Cited

U.S. PATENT DOCUMENTS

| | | | |
|---|---|---|---|
| 2,471,959 | 5/1949 | Hunt | 526/254 |
| 2,635,093 | 4/1953 | Miller et al. | 526/255 |
| 3,031,437 | 4/1962 | Iserson | 526/216 |
| 3,069,401 | 12/1962 | Gallagher | 526/254 |
| 3,574,783 | 4/1971 | Thorsrud | 526/255 |
| 4,076,929 | 2/1978 | Dohany | 526/255 |
| 4,123,603 | 10/1978 | Stewart | 526/254 |

Primary Examiner—Joseph L. Schofer
Assistant Examiner—Peter D. Mulcahy
Attorney, Agent, or Firm—Stevens, Davis, Miller & Mosher

[57] ABSTRACT

A process for preparing vinylidene fluoride homopolymers having low molecular weight and its copolymers by carrying out the polymerization in the presence of a radical initiator at a temperature ranging from 20° to 160° C. in a solvent of general formula R—COO—$R_1$, wherein R is hydrogen or an alkyl radical having up to 4 carbon atoms and $R_1$ is an alkyl radical with up to 5 carbon atoms.

15 Claims, No Drawings

PROCESS FOR PREPARING VINYLIDENE FLUORIDE HOMOPOLYMERS AND ITS COPOLYMERS

This application is a continuation of application Ser. No. 779,951, filed 9/20/85, now abandoned.

THE PRIOR ART

This invention relates to a process for preparing vinylidene fluoride homopolymers having low molecular weight and its copolymers by polymerization in solution.

As it is known, the most common processes for preparing fluoropolymers, and in particular fluoroelastomeric copolymers of vinylidene fluoride, utilize the copolymerization in emulsion technique in an aqueous medium at high pressures, as it is described by Kirk Othmer, Encyclopaedia of Chemical Technology, vol. 8, page 504 and foll. (1979).

Acording to this technique, the copolymerization is carried out in the presence of radical initiators, either organic or inorganic, mostly ammonium persulphate or potassium persulphate, in the presence of emulsifiers and of a chain regulator such as for example carbon tetrachloride.

At the end of the copolymerization, the latexes are coagulated by addition of salts or of acids or of a combination thereof.

These processes exhibit, however, a non-negligible drawback, namely the presence, in the product so obtained, of inorganic residues due to the initiator and in particular to the mineral salts or acids utilized for the coagulation.

Said inorganic residues, even if present in very low amounts, affect adversely the chemical-physical properties of the fluoropolymer or of the fluoroelastomer in many applications.

U.S. Pat. No. 3,069,401 describes a polymerization process for preparing elastomeric copolymers of vinylidene fluoride and hexafluoropropene by means of radical initiators and in the presence of a chain transfer selected among aliphatic compounds of the type of alcohols, ketones and carboxylic acid esters.

The copolymerization reaction is conducted in bulk, with transfer/monomers molar ratios ranging from ½ to 1/40.

This second metod provides copolymers having only a low molecular weight, generally ranging from 1200 to 8400, and containing remarkable amounts of the chain transfer, from 0.9% to 7% by weight.

Said amounts of chain transfer in the copolymers affect adversely the chemical and physical properties of the copolymers in many applications.

Vinylidene fluoride homopolymers are usually prepared in the art by radical polymerization of the monomer in aqueous emulsion or in suspension, in the presence of chlorofluorocarbons as solvent. The homopolymer can also be prepared by using radiations as it has been described in G.B. Pat. No. 1,188,889.

By operating according to these methods homopolymers are obtained having an high viscosimetric molecular weight, generally ranging from 300,000 to 1,000,000.

In addition the so obtained homopolymers contain large amounts of chain transfer similar to those indicated above for the copolymers.

When the polymerization is carried out in fluorocarbon solvent the amounts of solvent which remains in the homopolymers is very high, generally ranging from 5% to 10% by weight.

THE PRESENT INVENTION

The Applicant has now surprisingly found that it is possible to remove the drawbacks described hereinabove if the homopolymerization of vinylidene fluoride or its copolymerization with hexafluoropropene or tetrafluoroethylene or mixtures thereof, is carried out in a particular class of solvents.

In particular the amounts of residues solvent in the (co)polymers are very low, in general lower than 0.3% by weight.

Thus, it is the object of the present invention to provide a process for preparing homopolymers of vinylidene fluoride having low molecular weight and copolymers of the same with hexafluoropropene, tetrafluoroethylene or mixtures thereof, which comprises carrying out the (co)polymerization in the presence of a radical initiator and in a solvent selected from the esters of general formula:

$$R\text{---}COO\text{---}R_1 \qquad (I)$$

in which R is a hydrogen atom or an alkyl radical containing from 1 to 4 carbon atoms and $R_1$ is an alkyl radical containing from 1 to 5 carbon atoms.

R and $R_1$ may also contain, as substituents, the hydroxyl group OH or the alkoxy group $OR_2$ where $R_2$ is an alkyl radical containing from 1 to 5 carbon atoms.

The (co)polymerization is carried out at temperatures ranging from 20° to 160° C., in the presence of a radical initiator and with solvent/(co)polymer weight ratios in the range of from 4/1 to 10/1.

Radical initiators preferred are selected from organic peroxide-type free-radical formers and azo catalysts, described in Encyclopaedia of Polymers Science and Technology, vol. 3, pag. 27, 1969 such as -azo-bis-alkyl-nitrile, in particular 2,2'-azo-bis-isobutyronitrile and 2,2'-azo-bis-2-methylbutyronitrile.

Radical initiators which are suitable for the copolymerization in solution reaction forming the object of the present invention may be the ones commonly utilized in the technique of the art, such as the organic peroxides cited in Kirk Othmer, Encyclopaedia of Chemical Technology, Vol. 8, pages 504 and foll. (1979).

Examples of useful organic peroxides are benzoyl peroxide, dicumyl peroxide, bis-(4-t-butyl-cyclo-hexyl)-peroxide-dicarbonate and di-t-butyl peroxide.

In particular, there are preferred the radical initiators active at temperatures lower than 50° C., such as bis-(4-t-butyl-cyclohexyl)-peroxy-dicarbonate, if the copolymer must have a high molecular weight, or radical initiators active at higher temperatures, for example above 120° C., such as di-t-butyl-peroxide, if the copolymer must have lower molecular weights.

The copolymer obtained according to the process forming the object of this invention have molecular weights varying over a wide range corresponding to inherent viscosity values from 0.02 dl/g up to values higher than 0.5 dl/g.

Preferred solvents for the copolymers are the esters of the formic, acetic, propionic acids with methyl, ethyl and t-butyl alcohol. Since the ester is also a chain transfer, if it is desirable to obtain high molecular weight copolymers, then it is advisable to use esters which contain only methyl groups, while the presence of $-CH_2-$ groups of alcoholic origin results in a higher transferring action and so in lower molecular weights.

Solvents which promote the obtainment of high molecular weight copolymers are methyl formate and acetate or t.butyl formate and acetate; ethyl acetate may be used as a solvent which promotes the obtainment of low molecular weights.

From H. F. Mark, Encyclopaedia of Polymer Science and Technology, vol. 3, page 605 (1965) it is also known that the chain transfer action which leads to the obtainment of lower molecular weights is enhanced if it is operated at higher temperatures; temperatures exceeding 120° C. are preferred when a low molecular weight product is to be obtained, while temperatures below 50° C. are preferred for the obtainment of high molecular weight copolymers.

The process forming the object of the present invention is particularly suitable to obtain copolymers containing from 40 to 95% by moles of vinylidene fluoride, from 0 to 5% by moles of hexafluoropropene and from 0 to 30% by moles of tetrafluoroethylene. More preferably the copolymers contain from 50 to 85% by moles of vinylidene fluoride, from 15 to 45% by mole of hexafluoropropene and from 0 to 25% by moles of tetrafluoroethylene.

By operating under the copolymerization conditions in order to obtain the last copolymers, said copolymers remain dissolved in the solvent during the copolymerization.

The obtainment of a copolymers dissolved in the solvent allows some advantages since they can directly be used in the vulcanization step as indicated below.

We have furthermore found that in the homopolymerization of vinylidene fluoride, with the working conditions shown above, an homopolymer having very low molecular weight comprised between 1,000 and 20,000, is obtained, these data being referred to the average viscosimetric molecular weight.

For obtaining vinylidene fluoride homopolymers having viscosimetric molecular weight between 1000 and 5000, preferred conditions consist in operating at temperatures ranging from 130° to 150° C. with a initiator consisting of di-t.-butylperoxide in an amount ranging from 1 to 4 g per 100 g of vinylidene fluoride, in the presence of methyl acetate in amounts 4–40 times the weight of the vinylidene fluoride.

The polyvinylidene fluorides obtained by the process according to the invention are particularly utilizable as plasticizers for paints based on vinylidene polyfluoride and as additives of fluorinated elastomers based on vinylidene fluoride.

According to another embodiment of the present invention vinylidene fluoride homopolymers are obtained in solution, by carrying out the polymerization reaction in methyl or ethyl acetate, methyl and ethyl formate as a solvent; the solution can be directly used as such to prepare films and coatings as described in Encyclopaedia of Polymers Science and Technology, vol. 14, pag. 606, 1969.

Otherwise the homopolymer can be recovered by known methods such as evaporation and the final product contains amounts of solvent less than 0.2% by weight.

The copolymers of vinylidene fluoride obtained at the end of the copolymerization in solution in its own solvent can be used as such or it can be recovered by means of usual operations such as precipitation and washing in water or in an organic liquid.

If the copolymer is to be isolated by precipitation in water, then the copolymerization should be preferably conducted in solvents exhibiting a sufficient solubility in water, such as e.g. methyl formate, ethyl formate and methyl acetate, whose solubilities in water at 20° C. are of about 23, 9 and 24% by weight, respectively.

Conversely, if one wants to directly utilize the polymeric solution, then it is advantageous to use less water-soluble and less volatile solvents, such as e.g. butyl acetate or t-butyl acetate.

In the last case the solution can be additioned with the conventional vulcanization ingredients such as, for example, Tecnocin ® A, a Schiff base prepared from cinnamic aldehyde and hexamethylene diamine, magnesium and/or lead oxides, calcium hydroxide, etc., and vulcanization is directly accomplished by heating and evaporating of the solution. If the copolymer is to be utilized in the solid state, then the solution is precipitated in water or in another liquid, as much soluble as possible in the ester of the polymerization reaction, for example hexane, cyclohexane; said liquid is preferably employed in amounts from 4 to 20 times greater than the reaction solution volume.

The copolymer is filtered and the last traces of ester are removed by heating to temperatures higher than 50° C. or, if the precipitation is effected in water, by stripping with steam.

The resulting copolymer, after drying in a ventilated oven, contains solvent amounts lower than 0.3% by weight.

Some illustrative, but non-limitative examples are given hereinbelow for the purposes of a better understanding of the present invention and of carrying it into practice.

EXAMPLE 1

1 liter of methyl acetate and 5 g of bis-4-t-butyl-peroxy-dicarbonate (Perkadox 16) were charged, at 15° C., into a 3-1 autoclave equipped with a mechanical stirrer. Under an autogenous pressure there were introduced 50 g of hexafluoropropene. Subsequently, by means of a compressor, a gaseous mixture having the following molar composition:

| | |
|---|---|
| vinylidene fluoride (VDF) | 80% |
| hexafluoropropene (PFP) | 20% | was introduced from a gasholder, till reaching a pressure of 5 atm. By heating to 45° C., the pressure rose to 8 atm. When the pressure began to decrease, the feeding of the same gaseous mixture contained in the gasholder was resumed, n order to maintain a constant pressure of 8 atm. in the autoclave. After 20 minutes, 3 moles of monomers were consumed. Stirring was stopped, the autoclave was cooled down, the residual gases were discharged and the solution was collected. The copolymer was precipitated by pouring the solution into demineralized water, it was washed with water and dried at 60° C. under vacuum.

The product exhibited an intrinsic viscosity of 0.25 dl/g in methylethylketone (MEK) at 30° C. and had a composition corresponding to the one of the monomeric mixture; the methyl acetate content in the product was lower than 0.3% by weight.

EXAMPLE 2

It was operated as in example 1, but with 60 g of hexafluoropropene and introducing from the gasholder, a mixture consisting for 90% by moles of VDF and for 10% by moles of PFP, at a pressure of 13 atm.; after a 67-minute reaction, 4 moles of monomer were consumed. The copolymer, which was isolated as in example 1, has an intrinsic viscosity of 0.39 dl/g in DMF at 30° C. and a composition corresponding to 90% by moles of VDF and 10% by moles of PFP; the methyl acetate content in the product is lower than 0.2% by weight.

EXAMPLE 3

It was operated as in example 1 at 40° C. and using as a solvent 1 liter of t-butyl acetate instead of methyl acetate. After a 60-minute reaction, 4 moles of monomers were consumed.

The copolymer, after isolation by precipitation in hexane, exhibited an intrinsic viscosity of about 0.6 dl/g in MEK at 30° C.

EXAMPLE 4

It was operated as in example 2 at 40° C. and using as a solvent 1 liter of methyl formate. After a 90-minute reaction, 4 moles of monomers were consumed.

The copolymer has an intrinsic viscosity of 0.7 dl/g in DMF at 30° C. The solution was then poured into 10 l of demineralized water and the resulting product was filtered and then stripped in 2 l of water by means of steam.

After cooling, the copolymer was filtered and dried in a ventilated oven at 50° C. The solvent content is lower than 0.1%.

EXAMPLE 5

300 cc of a solution prepared as in example 3 were treated under stirring with 4 g of Tecnocin A, 10 g of lead oxide and 25 g of carbon black.

The slurry so obtained was applicated as a paint onto an iron surface. By heating to 100° C. by means of hot air, solvent evaporation and cross-linking were simultaneously obtained.

EXAMPLE 6

It was operated as in example 1, but with 1 liter of ethyl acetate and 6 g of di-t-butyl peroxide.

40 g of perfluoropropene were introduced by means of an autogeneous pressure. From a gasholder and by means of a compressor, a gaseous mixture having the following molar composition: VDF=65%; PFP=19%; TFE=16%, was fed till a pressure of 8 atm. It was heated to 130° C. and the pressure rose up to 16 atm.

The resulting copolymer exhibited an intrinsic viscosity of 0.15 dl/g and a composition corresponding to that of the monomeric mixture.

EXAMPLE 7

Into a 0.3-liter autoclave, equipped with a slide stirrer, there were introduced:

| | |
|---|---|
| methyl acetate | 100 cc |
| di-t,-butylperoxide | 0.25 cc |
| vinylidene fluoride | 11.8 g. |

The autoclave content was brought, under stirring, to 130° C. in an oil bath, where it was maintained during 30 minutes. During the reaction, the pressure reached a maximum value of 18 atmospheres.

A polymeric solution was obtained, from which the polymer (polyvinylidene fluoride) was separated by evaporation of the solvent. In order to characterize the product, it was then dissolved again in methyl acetate, re-precipitated by pouring it into water, and dried at 70° C. under vacuum. The amount of polymer obtained was of 2.1 g.

The N.M.R. analysis of hydrogen revealed that the average molecular weight of the polymer was 1700; the polymeric chain end groups resulted to consist of:
—$CF_2$—$CH_2$—OCO—$CH_3$;     —$CF_2$—$CH_2$—$CF_2H$;
—$CH_2$—$CF_2$—$CH_3$.

The polymer melting temperature was ranging from 143 to 145° C. The inherent viscosity determined by Desreux-Bishoff viscosimeter in dimethylacetamide at 25° C. was equal to 0.06 dl/g, corresponding to a viscosimetric molecular weight of 4,800 according to the G. J. Welch relation (Polymer, 15, page 429, 1974).

EXAMPLE 8

It was operated as in example 7, with the exception that 0.7 g of Perkadox 16 (bis-4-t-butyl-cyclohexyl-peroxy-dicarbonate, produced by AKZO) were used as a initiator, and that polymerization was conducted at 45° C. during 60 minutes, obtaining 3.2 g of a polymer having an average viscosimetric molecular weight of 11,000.

The average numerical molecular weight resulting from the data of Nuclear Magnetic Resonance of Hydrogen was of about 3,500.

EXAMPLE 9

It was operated as in example 7, but at 150° C. during 15 minutes, at a maximum starting pressure of 20 atmospheres.

Obtained were 2.2 g of a polymer having a melting temperature of 131° C., an average numerical molecular weight determined by N.M.R. equal to 1,200 and an average viscosimetric molecular weight, determined as above, equal to 3,600.

EXAMPLE 10

It was operated as in example 8, but carrying out the polymerization reaction at 45° C. during 90 minutes and by using 0.6 g of Perkadox 16 and 100 ml of ethyl acetate as solvent.

Obtained were 2.8 g. of a polymer having an average viscosimetric molecular weight, determined as above, equal to 4,000.

We claim:

1. A process for preparing copolymers of vinylidene fluoride with hexafluoropropene or tetrafluoroethylene or mixtures thereof, said copolymers containing less than 0.3% by weight of solvent as hereinafter defined, characterized in that the polymerization reaction is carried out in the presence of a radical initiator at temperatures comprised between 20° and 160° C., in a solvent selected from carboxylic acid esters having general formula:

R—COO—$R_1$ in which R is a hydrogen atom or an alkyl radical containing from 1 to 4 carbon atoms and $R_1$ is an alkyl radical containing from 1 to 5 carbon atoms, R and $R_1$ being optionally substituted with —OH or —$OR_2$ groups, wherein $R_2$ is an alkyl radical containing from 1 to 5 carbon atoms; the weight ratio solvent/copolymer ranges from 2.7 to 10 at the end of the reaction; and the copolymer is recovered from its solution by adding the solution to water or another liquid in which the copolymer is insoluble, thereby causing the copolymer to precipitate.

2. The process of claim 1 characterized in that the radical initiator is selected from the group consisting of organic peroxide-type free-radical formers and azo catalysts.

3. The process of claim 2 characterized in that the radical initiator is an azo-bis-alkylonitrile.

4. The process of claim 2 in which the radical initiator is azo-bis-isobutyrronitrile.

5. The process of claim 1, characterized in that the copolymers contain from 40 to 95% by moles of vinylidene fluoride, from 0 to 45% by moles of hexafluoropropene and from 0 to 30% by moles of tetrafluoroethylene the total amount of hexafluoropropene plus tetrafluoroethylene ranging from 5 to 60% by moles.

6. The process of claim 1, characterized in that the copolymers contain from 50 to 85% by moles of vinylidene fluoride, from 15 to 45% by moles of hexafluoropropene and from 0 to 25% by moles of tetrafluoroethylene.

7. The process of claim 1, characterized in that the solvent is an ester of an acid selected from the group consisting of formic acid, acetic acid and propionic acid with an alcohol selected from the group consisting of methyl alcohol, ethyl alcohol and t-butyl alcohol.

8. The process of claim 1, characterized in that the solvent/copolymer weight ratio ranges from 4 to 10 at the end of the polymerization reaction.

9. A process for preparing high molecular weight copolymers according to claim 1, characterized in that the reaction is conducted in the presence of a solvent selected from the group consisting of methyl formate, methyl acetate, t-butyl formate and t-butyl acetate, at a temperature in the range from 20 to 50° C. and using bis-(4-t-butylcyclohexyl)-peroxydicarbonate as a radical initiator.

10. A process for preparing low molecular weight copolymers according to claim 1, characterized in that the reaction is conducted in the presence of ethyl acetate as a solvent, at a temperature ranging from 120 to 160° C., using t-butyl-peroxide as a radical initiator.

11. A process for preparing homopolymers of vinylidene fluoride having a low molecular weight, said homopolymers containing less than 0.3% by weight of solvent as hereinafter defined, characterized in that the polymerizaiton reaction is carried out in the presence of a radical initiator at temperatures of from 20° to 160° C., in a solvent selected from the group consisting of methyl acetate, ethyl acetate, methyl formate and ethyl formate; the weight ratio solvent/polymer ranges from 2.7 to 10 at the end of the reaction; and the polymer is recovered from its solution by adding the solution to water or another liquid in which the polymer is insoluble, thereby causing the polymer to precipitate.

12. The process of claim 11, characterized in that the radical initiator is selected from the group consisting of organic peroxide-type free radical formers and azo catalysts.

13. The process of claim 12, characterized in that the radical initiator is an azo-bis-alkylonitrile.

14. The process of claim 12, characterized in that the radical initiator is azo-bis-isobutyrronitrile.

15. The process of claim 11, characterized in that the solvent/polymer weight ratio ranges from 4 to 10 at the end of the polymerization reaction.

* * * * *